Nov. 4, 1969   H. J. LOEWENTHAL   3,476,150

DIVERTER VALVE

Filed Feb. 4, 1966   2 Sheets-Sheet 1

Nov. 4, 1969     H. J. LOEWENTHAL     3,476,150

DIVERTER VALVE

Filed Feb. 4, 1966     2 Sheets-Sheet 2

United States Patent Office 3,476,150
Patented Nov. 4, 1969

3,476,150
DIVERTER VALVE
Henry J. Loewenthal, Louisville, Ky., assignor to American Standard Inc., a corporation of Delaware
Filed Feb. 4, 1966, Ser. No. 525,161
Int. Cl. F16k 11/06
U.S. Cl. 137—625.11                          15 Claims

ABSTRACT OF THE DISCLOSURE

A diverter valve for use in a water supply pipe system for diverting water to one of several outlets comprising a manifold member adapted to be installed in the water supply system; the manifold member having a main water supply inlet pasageway and a pair of outlet passageways; a valving means detachably connected to the manifold member for selectively diverting water from the main inlet passageway to either one of the outlet passageways; and means for detachably connecting the valving means to the manifold member whereby the valving means can be readily removed or replaced to enhance the maintenance and repair thereof.

---

This invention relates in general to a diverter valve, and more specifically to a diverter or transfer valve particularly adapted to selectively divert water between a bath filler and a shower.

An object of this invention is to provide an improved diverter or transfer valve that is relatively simple in construction, inexpensive to fabricate and positive in operation.

Another object is to provide a diverter valve comprising a cartridge type valving mechanism that can be readily replaced or removed from a supply fixture or manifold.

Still another object is to provide a diverter valve having a totally sealed valving cartridge provided with complementary valving members for effecting the diversion of the fluid from the main inlet to any one of several selectable outlets.

The foregoing objects and other features and advantages are obtained by a diverter valve comprising a manifold fixture which is adapted to be installed directly into a supply pipe system; and a cartridge valving means adapted to be detachably connected to the manifold fixture. The manifold fixture includes an inlet pasageway which is connected to the supply system and a plurality of separate outlet pasageways, one of which may connect to a bath filler and the other to a shower. The valving cartridge, detachably connected to the fixture, is comprised essentially of a sealed cartridge housing having openings formed therein which are adapted to be disposed in communication with the respective inlet and outlet passageways of the fixture. A sealing means interposed between the manifold fixture and the cartridge housing insures a fluid tight seal therebetween.

Sealed within the chamber defined by the cartridge housing is a valving means comprising a stationary member and a relatively movable member disposed in cooperative arrangement to effect diversion of the fluid entering the cartridge housing from the inlet passageway of the fixture to one or the other of the respective outlets thereof. Accordingly, the stationary member is provided with inlet and outlet ports which are arranged in communication with the inlet and outlet openings, respectively, formed in the cartridge housing and which in turn are in communication with the inlet and respective outlet passageways of the fixture. The movable member is provided with means arranged to selectively connect the inlet port of the stationary member into communication with one of the respective outlet ports therein so that the fluid flowing through the fixture inlet pasageway will flow into the valve cartridge through the inlet opening thereof and thence outwardly thereof through one of the outlet ports and connected outlet pasageway depending on the relative positions of the respective valving members. An actuating means is operatively connected to the movable valving member to selectively position the same with respect to the stationary member to control the direction of fluid flow through the cartridge.

In accordance with this invention, the respective complementary valving member is provided with a smooth, substantially flush, interfacing surface disposed in continuous sliding relationship, and the seal or gasket disposed between the housing and the fixture is specifically constructed and arranged to exert a force on the valving members sufficient to maintain the same in adjusted position and in fluid sealing relationship.

A feature of this invention resides in the provision of a transfer valve that includes a sealed cartridge valving member that can be readily attached and detached as a complete unit from a manifold fixture installed in a supply system.

Another feature of this invention resides in the provision of an improved sealing arrangement for effecting a fluid tight seal between tht cartridge valving mechanism and the manifold fixture of the diverting valve and which sealing arrangement also functions to exert the proper sealing bias on the complementary valving members disposed within the cartridge housing for maintaining the interfacing between the respective valving member in fluid tight relationship without adversely affecting the operating ease with which the valving members are actuated.

Another feature of this invention resides in a diverter valve having a cartridge type valving mechanism which can be readily removed and replaced as a complete unit with a maximum of ease and by a minimum of effort.

Other features and advantages will become more readily apparent when considered in view of the drawings and specifications in which.

Figure 1:
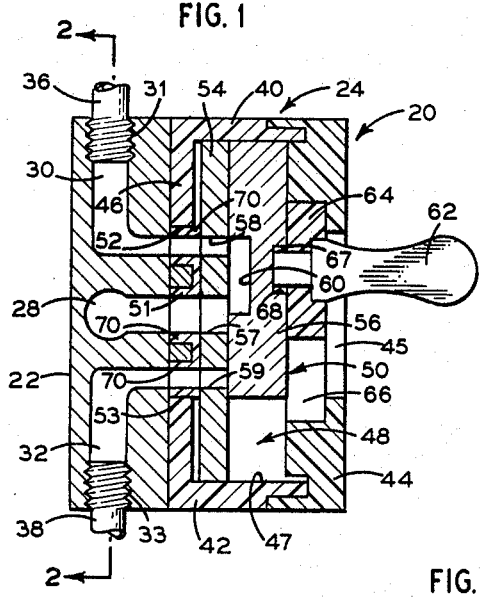
FIG. 1 illustrates a cross-sectional view of the improved diverter valve construction of the instant invention.
Figure 4:
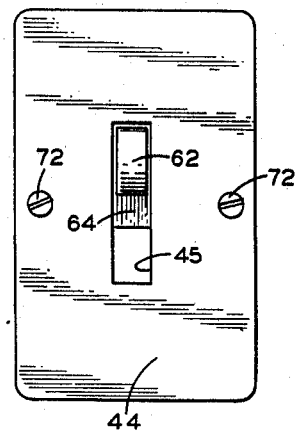
FIG. 4 illustrates a front elevation view of the diverter valve of the instant invention.

Referring to the drawings, there is shown in FIGS. 1 through 7, a diverter valve or transfer valve construction 20 embodying the concept of the instant invention. The valve 20 disclosed may be used to divert water either to a bath filler or a shower head when used in conjunction with a dual or single control bath faucet. Accordingly, the valve 20 can be constructed as a separate individual valve, or as part of a bath and shower fitting.

Figure 2:
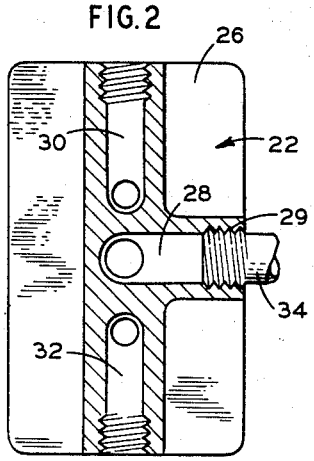
FIG. 2 illustrates a sectional view of the manifold fixture taken along line 2—2 on FIG. 1.
Figure 3:
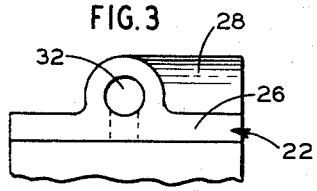
FIG. 3 is an end view of the manifold fixtures of FIG. 2.
Figure 7:
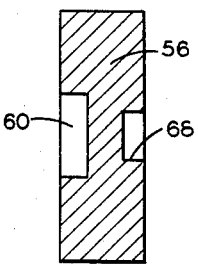
FIG. 7 is a sectional view of the movable valve member taken along line 7—7 on FIG. 6.

As shown in FIG. 1, the diverter valve is comprised essentially of a manifold fixture 22 which is adapted to be installed in the water supply system and a readily detachable cartridge valving means 24. As best seen in FIGS. 1 through 3, the manifold 22 comprises a fixture having a base 26 on which there is integrally formed a means for defining an inlet passageway 28 and a pair of opposed separate and distinct water outlet passageways 30 and 32. The arrangement is such that the inlet 29 to the main passageway 28 is threaded for receiving the threaded end connection of a water supply pipe 34. The respective outlet passageways 30 and 32 in turn have their respective outlet end portions 31 and 33 threaded to connect in communication with conduits 36 and 38 for directing water to a bath filler or a shower, respectively.

The cartridge valving portion 24 of the assembly includes a housing 40 comprising a pair of complementary members 42 and 44. In the illustrated form, one of the housing members 42 comprises a substantially rectangular backplate 46 which is adapted to be fitted flush against the base or mounting portion 26 of the fixture. A circumscribing wall 47 is integrally connected to the backplate 46 to define the end enclosure of the housing 40. The other member 44 of the cartridge housing 40 comprises a front plate which is fixedly secured to the peripheral end portion of the end closure wall 47. The respective housing components 42 and 44 may be suitably formed of plastic material and solvent welded, or previously sealed, to define a totally sealed housing. In the assembled position, cartridge members 42, 44 define a chamber 48 for accommodating the valving means 50.

As best seen in FIG. 1, the backwall 46 of the cartridge housing 40 is provided with a plurality of openings 51, 52, 53 which are so arranged so that they are disposed in alignment with respect to the inlet and outlet passageways of the manifold fixture. Accordingly, opening 51 defines the inlet to the valve means and openings 52 and 53 define the respective outlets. Means as hereinafter described are provided to form a fluid tight seal between the cartridge housing and a manifold fixture in the assembled position thereof.

Figure 5:
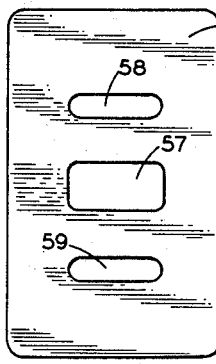
FIG. 5 is a detail plan view of the stationary valving member utilized in the valve construction of FIG. 1.

In accordance with this invention, the valving means 50 disposed within the valving chamber 48 comprises a stationary member 54 and a complementary relatively movable member 56. The stationary valving member 54 comprises a substantially rectangular shaped member which is adapted to be confined within the chamber 48 of the cartridge housing 40. It is to be noted that the dimensions of the stationary member 54 corresponds substantially to the internal shape of the chamber 48. As best seen in FIG. 5, the stationary member 54 is provided with a plurality of ports 57, 58 and 59 that extend therethrough. The respective ports include a center port 57 which is adapted to be disposed in alignment with inlet opening 51 formed in the backplate 46 of the cartridge housing 40 and in axial alignment with the outlet of the inlet passageway 28 of the manifold fixture. Disposed above and below the center port 57 of the stationary valving member are ports 58 and 59 which define outlets which are arranged in alignment with the respective outlet openings 52 and 53 formed in the backplate 46 of the cartridge housing 40 and in communication with respective outlet passageways 30 and 32 of the manifold fixture.

Figure 6:
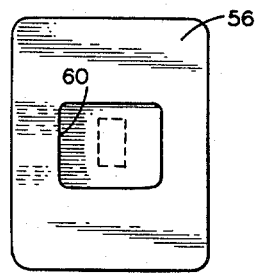
FIG. 6 is a detail plan view of the complementary movable valve member utilized in the valve construction of FIG. 1.

In cooperative relationship with the stationary valving member 54 there is disposed within the chamber a movable valving member 56. Referring to FIGS. 1 and 6, it is to be noted that the length of the movable valving member 56 is somewhat shorter than that of the stationary valving member 54. Accordingly, the movable valving member 56 is sized so that it can be moved in a vertical or reciprocal movement within the cartridge as seen in FIG. 1.

In accordance with this invention, the movable member 56 is provided with a means whereby it can connect the central port 57 of the stationary valving member 54 into communication with one or the other of the outlet ports 58 or 59 thereof depending upon the relative positions between valving members 54 and 56. Referring to FIGS. 1 and 6, it is to be noted that the movable member 56 is provided with a recess 60 formed in the surface thereof which is sized so that when the movable member 56 is in its uppermost position, as seen in FIG. 1, the recess 60 connects the inlet port 57 of the stationary member 54 into communication with the upper outlet port 58 thereof. Thus as disclosed in FIG. 1, the position of the respective valving members 54 and 56 is such that water entering the inlet passageway 28 of the fixture is directed into the valving cartridge housing through the opening 51 in the backplate, through the aligned center port 57 of the stationary valve member 54 and into the recessed portion 60 of the movable member whereby the water is directed upwardly to the outlet port 54 of the stationary member 54 and passageway 30 of the fixture which connects with a shower. When the movable member 56 is moved to its lowermost position, it will be noted that the recess 60 formed therein is displaced downwardly so that it connects the center port 57 of the stationary member 54 into communication with the lower outlet port 59 and 53 which diverts water to the outlet passageway 32 that connects to a bath filler. Accordingly, by effecting a simple displacement of the movable member 56 up or down, the water entering the manifold fixture through the inlet passageway 28 can be diverted to either of the outlet passageways 30 or 32.

In order to effect actuation of the movable valving member 56 to control the direction in which the water is permitted to flow, an actuating means in the form of a handle 62 is connected to a slide block 64 which is confined within a slideway 66 formed in the back surface of the cartridge front member 44, and which in turn is operatively connected to the movable member 54 by a projecting boss 67 adapted to be received in a recess 68 formed in member 54. As viewed in FIG. 4, the cartridge front member 44 is provided with an elongated opening 45 through which the handle 62 is extended. Accordingly, an operator may simply, by moving the handle 62 up and down, divert the water flowing through the valving means 50 accordingly.

It is to be noted that the combined thickness of the stationary member 54 and the movable member 56 is slightly less than the width of the chamber 48 defined in the cartridge housing 40. Accordingly, the sealing means comprise elastromeric gaskets 70 which are located between the interfacing of the fixture 22 and cartridge 24 and are arranged to extend through the openings 51, 52 and 53 in the backplate to exert force on the stationary member 54 which biases the movable member 56 between it and the front 44 of the housing. The arrangement is such that the interface of the respective valve members 54 and 56, which have highly polished sealing surfaces, are biased toward one another to form a fluid tight seal. Also, the bias which the gaskets 70 exert on the respective members 54 and 56 is sufficient to frictionally maintain movable member 56 in its adjusted position.

In accordance with this invention, it is contemplated that the cartridge housing 40 be totally sealed to form an integral unit. The valving means 50 disposed within the sealed cartridge are preferably formed of ceramic with highly polished surfaces and are permanently installed within the cartridge. Thus the entire cartridge then comprises an integrally formed unit which can be readily attached to or detached from the fixture 22 by means of a screw fastener 72 or the like. Consequently, in the event of repair or replacement, one simply is required to remove cartridge housing 40 from the manifold fixture 22 and replace the same with another unit. Thus, in the instant invention, repair, replacement, and maintenance of the diverter valve is readily afforded with a minimum of effort.

Figure 8:
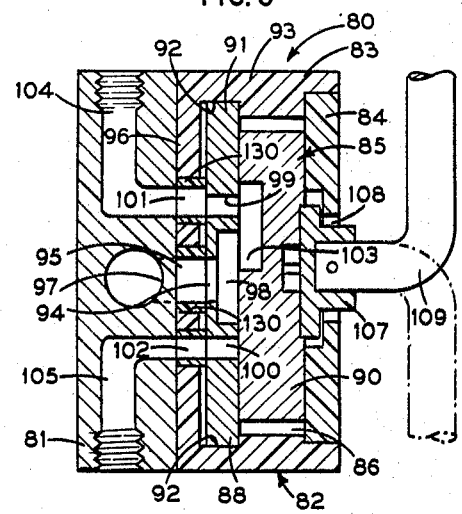
FIG. 8 is a cross-sectional view taken through a modified valve construction of this invention.
Figure 9:
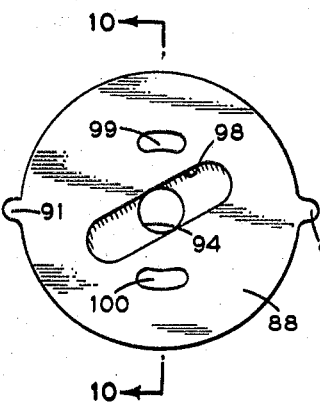
FIG. 9 is a detail plan view of the stationary valving member utilized in the embodiment of FIG. 8.
Figure 10:
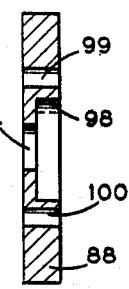
FIG. 10 is a sectional view of the stationary valving member taken along line 10—10 on FIG. 9.

FIGS. 8 through 12 illustrate a modified form of the invention. In this form of the invention, the manifold fixture of the diverter valve 80 is substantially similar to that hereinbefore described, and includes a fixture 81 and housing 82. The cartridge housing 82 is formed of a pair of complementary plastic members 83 and 84 solvent welded or permanently sealed together. However, in this form of the invention, the cartridge housing 82 is made circular in shape, and for this reason a rotary valving means 85 is interposed within the chamber 86 defined within the cartridge housing 82. Accordingly, the valving means 85 comprises a round stationary disc member 88 and a circular, relatively rotatable movable disc member 90. Accordingly, the stationary valving member 88 comprises a ceramic disc which is provided with a pair of opposed projections 91 adapted to be received in a complementary recess 92 formed in the side wall 93 of the housing 82. Thus, the stationary valving member 88 is maintained relatively fixed within the housing in the assembled position. As shown, the disc 88 is provided with an inlet port 94 which is adapted to be disposed in alignment with the inlet opening 95 formed in the backwall 96 of the housing 82 which in turn is in alignment with the outlet end of the inlet passageway 97 formed in the fixture 81. Formed in the smooth interface of the valve member 88 is an elongated recess 98 as shown in FIG. 8, which connects with the inlet port 94. Disposed above and below the inlet port 94, the member 88 is provided with similarly shaped outlet ports 99 and 100. As shown, each outlet port 99 and 100 is defined as an elongated or slotted opening which are respectively adapted to be disposed in alignment with the outlet openings 101 and 102 formed in the backwall 96 of the housing 82.

Figure 12:
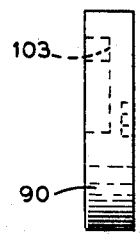
FIG. 12 is an end view of the valving member of FIG. 11.
Figure 11:
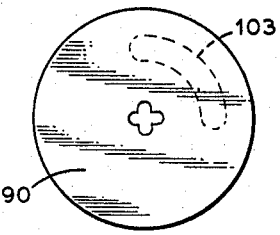
FIG. 11 is a detail view of the movable valving member utilized in conjunction with the valve construction of FIG. 8.
Figure 13:
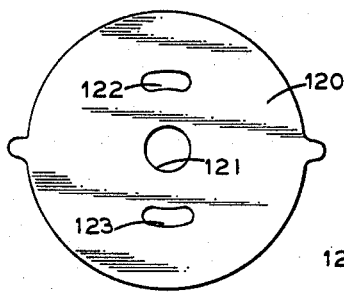
FIG. 13 is a detailed plan view of a modified stationary valving member adapted for use in the valve construction of FIG. 8.
Figure 14:
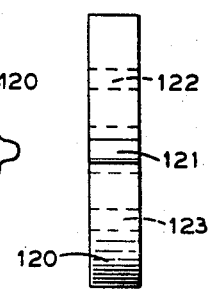
FIG. 14 is an end view of the stationary valving member of FIG. 13.
Figure 15:
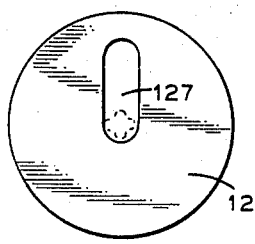
FIG. 15 illustrates a detail plan view of the movable valving member for complementing the stationary member of FIGS. 13 and 14.
Figure 16:
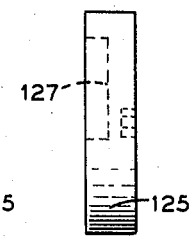
FIG. 16 is an end view of the movable valving member of FIG. 15.
Figure 17:
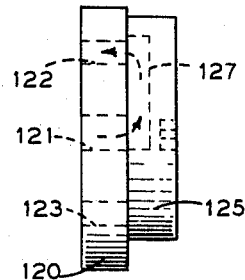
FIG. 17 is an assembly of the valving members disclosed in FIGS. 13–16.

The movable disc member 90, as best seen in FIGS. 11 and 12, is provided with an accurate recess 103 portion extending over a quadrant portion thereof. The arrangement is such that the accurate recess 103 of the movable member 90 is adapted to connect the elongated recess 98 on the interface of the stationary member with one or the other of the slotted port openings 99 or 100. Accordingly, the arrangement is such, as seen in FIG. 8, that when the rotary disc 90 is rotated to the position shown, the inlet recess 98 on the interface of the stationary disc 88 is connected in communication with one of the outlet ports 99 or 100 of the stationary disc by means of the quadrant recess 103 in the rotatable disc member 90. In the other rotated position thereof, the quadrant recess 103 will connect the recess 98 of the stationary member into communication with the other outlet port. Accordingly, the water may be directed to either one or the other of the outlet passageways 104 or 105 in the manifold fixture.

Means is provided in the form of an actuator for effecting the positioning of the rotary member 90 with respect to the stationary member 88. As shown, the actuator means comprises a hub 107 which is fixed to the rotary member 90. The hub 107 is provided with a portion which extends through an opening 108 in the front plate 84 of the housing 82. Accordingly, an operating handle 109 is secured to the projected portion of the hub 107, so that upon rotation of the handle means, the rotation thereof is transmitted to the rotary member 90 to effect the positioning of the recess 103 accordingly.

FIGS. 13 through 17 illustrate a modified form of valving means adapted for use in the rotary diverter valve of FIG. 8. In this form of the invention, the relatively stationary member 120 comprises a circular disc having defined centrally thereof an inlet port 121 and a pair of opposed outlet ports 122 and 123 extending therethrough. The rotary member 125, on the other hand, is provided with a radially extending slot 127 or recess formed on the interface surface thereof. The length of the slot 127 is sufficient to connect the inlet port 121 is of the stationary member with either one or the other of outlet ports 122 or 123 depending upon the rotative position of the valving member 125. The water entering the cartridge housing can thus be readily diverted from one direction to the other simply by effecting rotation of the handle 109 to effect displacement of the rotary member accordingly.

From the foregoing, it will be noted that the cartridge assembly of the modified construction may be totally factory sealed and assembled as hereinbefore described. The arrangement is such that the gasket means 130 which defines the seal between the cartridge assembly 82 and the manifold fixture 81 are specifically constructed and arranged so that the same will exert the proper bias on the complementary valving member 88, 90, 120 or 125 as hereinbefore described.

While the instant invention has been described with reference to particular embodiments thereof, it will be readily appreciated and understood that variations and modifications may be made without departing from the spirit or scope of the invention.

What is claimed is:

1. A diverter valve for use in a water supply pipe system for diverting water to one of several outlets comprising:
   a manifold member adapted to be installed in the water supply system, said manifold having a main water supply inlet passageway and a pair of outlet passageways;
   a valving means detachably connected to said manifold member for selectively diverting water from said main inlet passageway to either one of said outlet passageways, said valving means being a housing defining a valve chamber having an inlet opening and outlet openings therein disposed in communication with the inlet and outlet passageways of said manifold member respectively, and a means encased with said chamber for diverting the water flowing through said inlet opening to one of said outlet openings; and means for detachably connecting said valving means to said manifold member readily removed or replaced to enhance the maintenance and repair thereof.

2. The invention as defined in claim 1 wherein said valving means comprises: a housing; a pair of complementary valving members disposed in said housing; one of said valving members having an inlet and a pair of outlet ports in communication with the inlet and respective outlet passageways of said manifold member; and the other valving member being mounted for relative movement with respect to said one valving member and having means formed therein for connecting said inlet port in communication with one of said outlet ports to divert water therethrough accordingly; and means for positioning said other valving member relative to said one valving member to effect the diversion of water to one or to another of said outlet passageways.

3. The invention as defined in claim 2 and including sealing means disposed between said housing and manifold member, said sealing means imparting a bias on said valving members to maintain the same in fluid tight relationship.

4. The invention as defined in claim 1 wherein said valving means comprises: a housing; a first valving member having a plurality of openings including an inlet port and a pair of outlet ports disposed respectively in communication with said inlet and each of said respective outlet passageways of the manifold member; and a second valving member mounted for relative movement with respect to said first mentioned valving member; said movable valving member having a connecting passageway therein to connect the inlet port in said first member in communication with one of said outlet ports therein; each of said valving members having a substantially flush interfacing surface disposed with contiguous relationship; and sealing means disposed between said manifold and said housing biasing said valve members together to effect a fluid tight seal therebetween.

5. A diverter valve for use in a fluid supply system for diverting water for its source to one of several outlets comprising: a manifold fixture adapted to be installed in communication with said supply system; said fixture having means defining a fluid inlet passageway and a plurality of outlet passageways; a cartridge valve means adapted to be detachably connected to said fixture whereby said valve means can be readily removed; said cartridge valve means including a housing having a backwall portion formed with openings therein adapted to be disposed in communication with the inlet and respective outlet passageways of said fixture; means effecting a fluid tight seal between said fixture and said housing; means sealed within said housing for valving said openings; said valving means including a movable valving member having a connecting passageway formed therein for selectively connecting said inlet passageway in communication with at least one of said outlet passageways; and actuating means for effecting the movement of said movable member.

6. A diverter valve for use in a water supply pipe system for diverting water between a bath filler and a shower head comprising: a manifold fixture adapted to be installed in a water supply system; said fixture having a main water supply inlet passageway and a pair of supply outlet passageways, one of said outlet passageways conecting with the bath filler and the other connecting with the shower head; and a valving means operatively connected to said fixture for controlling the diversion of water from said supply inlet passageway to one or the other of said outlet passageways; said valving means including a housing formed of a pair of complementary members to define therebetween a valving chamber; said chamber having an opening disposed in communication with each of the respective inlet and outlet passageways of said fixture; means for effecting a fluid tight seal between said housing and said fixture; complementary valving members disposed within said chamber; said valving members including a first member and a second member; each of the valving members having a smooth interfacing surface disposed in contiguous relationship; said first member having ports formed therein disposed in communication with the inlet and respective outlet passageways and openings of said fixture and housing respectively; said second member having a connecting passageway formed in the interface surface thereof for connecting said inlet passageway in communication with one or the other of said outlet passageways to divert the water from said inlet passageway to one or the other of said outlet passageways in accordance with the position of said connecting passageway of said second member; and an actuating means for positioning the said second member relative to said first member for effecting the diversion of water from said inlet to one or the other of said outlet passageways.

7. A diverter valve for use in a water supply system for diverting water to either a bath filler or a shower head comprising: a manifold fixture adapted to be installed in a water supply system; said manifold having an inlet passageway and a pair of outlet passageways; a readily detachable valving means connected to said fixture to divert the water flowing through said inlet passageway to one or the other of said outlet passageways; said valving means including a housing defining a valving chamber; a pair of complementary valving members disposed within said chamber; one of said valving members having an inlet port disposed in communication with the inlet passageway of said fixture and an outlet port in communication respectively with each of said outlet passageways of said fixture; said other valving member having means for connecting said inlet port in communication with one of said outlet ports in said one member; each of said members having smooth interfacing surfaces disposed in contiguous relationship; one of said mounting members being mounted for relative movement with respect to the other to effect communication between the inlet and one of said outlet passageways of said fixtures to control fluid flow therethrough; a sealing means disposed between said housing and fixture to effect a fluid tight seal therebetween; said sealing means including an elastomeric gasket adapted to exert a bias on said valving members to maintain said interfacing surfaces thereof into contiguous abutting relationship with sufficient force to maintain the same in a frictional set relationship.

8. The invention as defined in claim 7 wherein one of said valving members is mounted for reciprocable movement with respect to the other member.

9. The invention as defined in claim 7 wherein one of said valving members is mounted for relative rotative movement with respect to its complementary valving member.

10. The invention as defined in claim 9 and including means for retaining the other of said valving members from rotating within said chamber.

11. The invention as defined in claim 9 wherein: one of said valving members includes means for prohibiting relative rotation thereof within said chamber; said one valving member having an inlet port, said inlet port including a bore formed on one side and a connected elongated recess formed on the interface side thereof, and a pair of outlet ports spaced therefrom; and said other valving member having an arcuate slot formed on interfacing side thereof to connect said recess with one of said outlet ports.

12. The invention as defined in claim 9 wherein: one of said valving members includes means for prohibiting relative rotation thereof within said chamber, has a central inlet port and an outlet port spaced at either side thereof; and said other valving member has a radial recess formed on the interfacing surface thereof arranged to connect said inlet port with one or the other of said outlet ports depending upon the relative rotative position of said valving members.

13. The invention as defined in claim 7 wherein the width of said valving chamber is slightly greater than the combined width of said valving members.

14. The invention as defined in claim 7 wherein one of said valving members includes: an inlet port and an outlet port disposed in spaced relationship to either side thereof; said inlet port being larger than either of said outlet ports; said movable valving member having a length less than that of said one valving member to render the movable member reciprocally displacable relative thereto within said chamber; said movable member having a recess formed on the interfacing surface thereof sized to connect the inlet port into communication with one or the other of said outlet ports.

15. A diverter valve for use in a water supply pipe system for diverting water to one of several outlets comprising; a manifold member adapted to be installed in the water supply system; said manifold member having a main water supply inlet passageway and a pair of outlet passageways; a valving means detachably connected to said manifold member for selectively diverting water from said main inlet passageway to either one of said outlet passageways; said valving means including a pair of cooperating ceramic discs, having highly polished sealing surfaces;

and means for detachably connecting said valving means to said manifold member whereby said valving means can be readily removed or replaced to enhance the maintenance and repair thereof.

References Cited
UNITED STATES PATENTS

| | | | |
|---|---|---|---|
| 377,599 | 2/1888 | Bourke | 137—625.48 |
| 637,487 | 11/1899 | Sellers | 137—625.48 |
| 2,974,681 | 3/1961 | Whitehurst | 137—625.11 |
| 3,294,363 | 12/1966 | Winkle et al. | 251—319 |
| 3,324,884 | 6/1967 | Dornaus | 137—625.17 |

M. CARY NELSON, Primary Examiner

W. R. CLINE, Assistant Examiner

U.S. Cl. X.R.

137—608